United States Patent
Foo et al.

(10) Patent No.: US 6,212,454 B1
(45) Date of Patent: Apr. 3, 2001

(54) METHOD AND APPARATUS FOR DISABLING AN ACTUATABLE RESTRAINT BASED ON DETERMINED CRASH VELOCITY AND DISPLACEMENT

(75) Inventors: Chek-Peng (Anson) Foo, Ann Arbor; Christopher John Hibner, South Lyon, both of MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/121,786

(22) Filed: Jul. 23, 1998

(51) Int. Cl.[7] .............................. G06F 17/00; G06F 7/00
(52) U.S. Cl. ..................... 701/45; 180/232; 180/268; 180/271
(58) Field of Search ..................... 701/45, 47; 180/232, 180/268, 271; 280/734, 735; 340/436, 429, 903

(56) References Cited

U.S. PATENT DOCUMENTS

| | | |
|---|---|---|
| 5,071,160 | 12/1991 | White et al. . |
| 5,118,134 | 6/1992 | Mattes et al. . |
| 5,187,465 * | 2/1993 | Stonerook et al. ................ 340/438 |
| 5,232,243 | 8/1993 | Blackburn et al. . |
| 5,400,487 | 3/1995 | Gioutsos et al. . |
| 5,411,289 * | 5/1995 | Smith et al. ........................ 280/735 |
| 5,446,661 | 8/1995 | Gioutsos et al. . |
| 5,482,314 | 1/1996 | Corrado et al. . |
| 5,497,327 * | 3/1996 | Takaya et al. . |
| 5,559,697 * | 9/1996 | Wang ................................. 280/735 |
| 5,587,906 | 12/1996 | McIver et al. . |
| 5,624,132 | 4/1997 | Blackburn et al. . |
| 5,653,462 | 8/1997 | Breed et al. . |
| 5,673,932 | 10/1997 | Nitschke et al. . |
| 5,692,775 | 12/1997 | Foo . |
| 5,702,123 | 12/1997 | Takahashi et al. . |
| 5,702,124 | 12/1997 | Foo et al. . |
| 5,746,444 * | 5/1998 | Foo et al. ........................... 280/735 |
| 5,758,899 * | 6/1998 | Foo et al. ........................... 280/735 |
| 5,785,347 * | 7/1998 | Adolph et al. ..................... 280/735 |
| 5,801,619 * | 11/1999 | Liu et al. ............................ 340/436 |
| 5,935,182 * | 8/1999 | Foo et al. ............................. 701/45 |
| 5,983,148 * | 11/1999 | Bigi et al. ............................ 701/45 |

* cited by examiner

*Primary Examiner*—William A. Cuchlinski, Jr.
*Assistant Examiner*—Gertrude Arthur
(74) *Attorney, Agent, or Firm*—Tarolli, Sundheim, Covell, Tummino & Szabo L.L.P.

(57) ABSTRACT

An apparatus for controlling an actuatable restraint (14) in a vehicle (12) includes an accelerometer (10) for providing a crash acceleration signal. A velocity determiner (60) determines a crash velocity value from the crash acceleration signal. A first comparator (62) compares the determined crash velocity value against a velocity threshold value (64). A displacement determiner (70) determines a crash displacement value from the crash acceleration signal. A second comparator (72) compares the determined crash displacement value against a displacement threshold value (74). A deployment determiner (50) is coupled to and responsive to the accelerometer (10) for determining if a deployment crash event is occurring and for providing a deployment control signal when it determines that a deployment crash event is occurring. The deployment control signal is further processed (80, 82) so that the deployment control signal is prevented from actuating the actuatable restraint (14) when the determined velocity value is greater than said velocity threshold value and the determined displacement value is greater than the displacement threshold value.

7 Claims, 2 Drawing Sheets

METHOD AND APPARATUS FOR DISABLING AN ACTUATABLE RESTRAINT BASED ON DETERMINED CRASH VELOCITY AND DISPLACEMENT

TECHNICAL FIELD

The present invention is directed to a method and apparatus for controlling an actuatable restraint and is more particularly directed to a method and apparatus for disable an actuatable restraint in response to a determined crash velocity and displacement indicating an out-of-position occupant.

BACKGROUND OF THE INVENTION

Actuatable occupant restraint systems for use in vehicles are well known in the art. Such restraint systems typically included an actuatable air bag, and accelerometer for sensing a vehicle crash condition, and control circuitry for performing a crash discrimination algorithm. The crash discrimination algorithm is responsive to the crash acceleration signal from the accelerometer. Crash algorithms often determined crash metrics such as crash velocity, crash displacement, crash jerk, etc., and compare these crash metrics against threshold values. In response to these comparisons, the actuation of the air bag is controlled. One air bag control arrangement is disclosed in U.S. Pat. No. 5,587,906 to McIver et al., and assigned to TRW Inc.

One known actuatable restraint control system monitors a vehicle crash condition using a displacement velocity crash metric. This arrangement is disclosed in U.S. Pat. No. 5,702,124 to Foo et al. and assigned to TRW Inc.

Other known actuatable restraint systems have recognized the desire to not deploy the restraint if the occupant is out-of-position ("OOP"). Such restraint systems include occupant position sensors that sense when an occupant is out-of-position and control the air bag in response thereto.

SUMMARY OF THE INVENTION

The present invention is directed to a method and apparatus for disabling actuation of an actuatable restraint when an occupant's determined velocity and displacement as a result of the crash has placed the occupant out-of-position so that the restraint would not have sufficient time to deploy and enhance occupant protection.

In accordance with one embodiment of the present invention, an apparatus is provided for controlling an actuatable restraint in a vehicle. The apparatus comprises a crash sensor for sensing a vehicle crash condition and control means responsive to the crash sensor for providing an actuation signal for actuating the actuatable restraint. The apparatus further includes means for determining a crash velocity value, means for determining a crash displacement value, and means for preventing the actuation signal from actuation of the restraint when the crash velocity value and the displacement value exceed associated limits.

In accordance with another embodiment of the present invention, an apparatus is provided for controlling an actuatable restraint in a vehicle, the apparatus comprising an accelerometer providing a crash acceleration signal indicative of crash acceleration of the vehicle. Velocity determining means is coupled to the accelerometer for determining a crash velocity value from the crash acceleration signal. First comparing means compares the determined crash velocity value against a velocity threshold value and provides a first comparison signal indicative of the result of the comparison by the first comparing means. The apparatus further comprises displacement determining means coupled to the accelerometer for determining a crash displacement value from the crash acceleration signal. Second comparing means compares the determined crash displacement value against a displacement threshold value and provides a second comparison signal indicative of the result of the comparison by the second comparing means. Deployment determining means is coupled to and responsive to the crash acceleration signal for determining if a deployment crash event is occurring and for providing a deployment control signal when it determines that a deployment crash event is occurring. The apparatus further comprises means for processing the deployment control signal with the first and second comparison signals so that the deployment control signal is prevented from actuating the actuatable restraint when the first comparison signal indicates that the determined velocity value is greater than the velocity threshold value and the second comparison signal means indicates that the determined displacement value is greater than the displacement threshold value.

In accordance with another embodiment of the present invention, a method is provided for controlling an actuatable restraint comprising the steps of sensing a vehicle crash condition, determining crash velocity, determining crash displacement, and actuating the restraint in response to the sensed crash condition, the determined crash velocity and the determined crash displacement so that the restraint is not actuated if the determined crash velocity and crash displacement exceed associated limits prior to the step of sensing a vehicle crash condition sensing a deployment crash condition.

In accordance with another embodiment of the present invention, a method is provided for controlling an actuatable restraint in a vehicle, comprising the steps of sensing crash acceleration of the vehicle and providing a crash acceleration signal indicative of crash acceleration of the vehicle. The method further comprises the steps of determining a crash velocity value from the crash acceleration signal, comparing the determined crash velocity value against a velocity threshold value, and providing a first comparison signal indicative of the result of the comparison of the crash velocity value against said velocity threshold value. A crash displacement value is determined from the crash acceleration signal, the determined crash displacement value is compared against a displacement threshold value, and a second comparison signal is provided indicative of the result of the comparison of the crash displacement value against the displacement threshold value. The method further comprises the steps of determining if the actuatable restraint should be actuated based on the crash acceleration signal and providing a deployment control signal when it is determined that a deployment crash event is occurring. The deployment signal is processed with the first and second comparison signals so that the deployment control signal is prevented from actuating the actuatable restraint when the determined velocity value is greater than the velocity threshold value and the determined displacement value is greater than the displacement threshold value.

BRIEF DESCRIPTION OF THE DRAWINGS

The foregoing and other features and advantages of the present invention will become apparent to those skilled in the art to which the present invention relates from a reading of the following detailed description of preferred embodiments with reference to the accompanying drawings, in which.

DESCRIPTION OF PREFERRED EMBODIMENT

Figure 1:
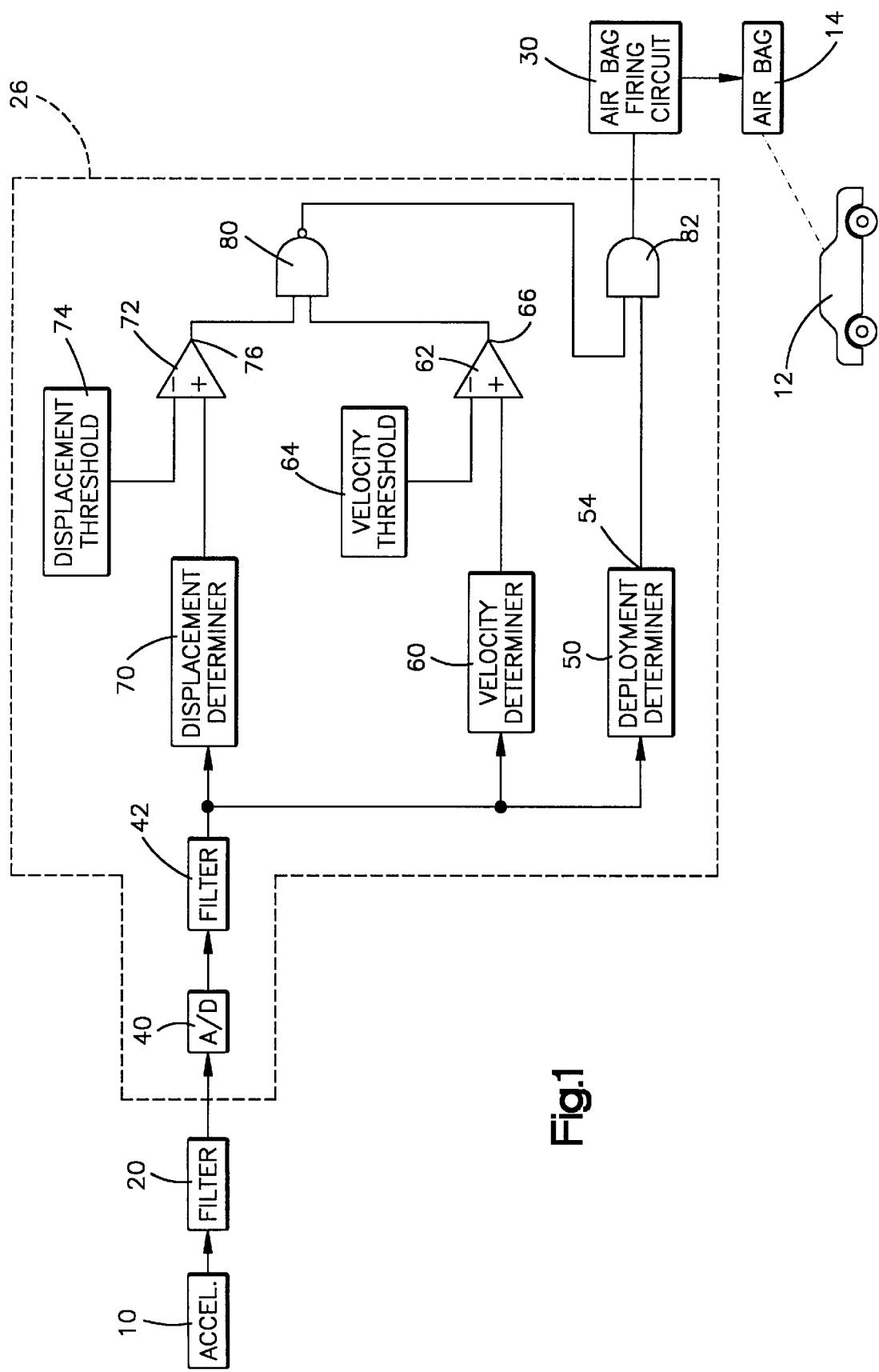
FIG. 1 is a schematic block diagram of a control apparatus in accordance with the present invention.

Referring to FIG. 1, an accelerometer 10 is mounted to a vehicle 12 so as to provide a crash acceleration signal having a characteristic (e.g., frequency, amplitude, etc.) indicative of crash acceleration experienced by the vehicle 12 during a crash event. For the purposes of explanation, the restraint device 14 is an air bag mounted forward of the occupant for enhancing protection during a frontal crash condition. The invention is applicable to other actuatable restraint devices. The accelerometer 10 provides a crash acceleration signal having a component when the crash is a forward crash condition. The present invention is also applicable to side actuatable restraint systems.

The accelerometer output signal is connected to a filter circuit 20 which removes signal characteristics that are not useful in discriminating a vehicle crash condition for which actuation of the actuatable restraint 14 is desired. The filtered crash acceleration signal is connected to a controller 26 such as a microcontroller. The controller 26, although described herein as a microcontroller, could comprise discrete circuit elements to accomplish the described functions in accordance with the present invention. Such discrete circuit elements could be assembled as part of an application specific integrated circuit ("ASIC") or, simply, mounted on a circuit board.

The output of the controller 26 is connected to an air bag firing circuit 30. The firing circuit 30 is operably connected to the air bag restraint 14 and specifically, to a squib (not shown) of the air bag restraint. As is well known, actuation of a squib, initiates the flow of pressurized fluid into the air bag from a source of inflation fluid.

Within the controller 26, a plurality of functions are performed. As mentioned, these functions could either be performed by a microcontroller programmed to perform the functions or by discrete circuitry that performs the functions. The output of the filter 20 is connected, preferably, to an analog-to-digital ("A/D") input 40 of the controller 26. The digitized crash acceleration signal, which is the output of A/D converter 40, is digitally filtered by filter 42. Filter 42 further removes signal characteristics not helpful in crash discrimination.

The filtered acceleration signal is connected to a deployment determiner function 50 for a determination as to whether the air bag 14 should be deployed. A deployment crash condition is a condition in which deployment of the air bac 30 would likely enhance protection of the occupant during the crash event. As mentioned, any of several known deployment algorithms could be used. Preferably, the deployment algorithm of U.S. Pat. No. 5,587,906 to McIver et al. is used. If a deployment condition is determined to be occurring by determiner 50, a HIGH or TRUE signal 54 is output from deployment determiner function 50.

A velocity determining function 60 is coupled to the filtered acceleration signal and determines a velocity value from the acceleration signal by integration. The determined velocity value is connected to one input of a comparator function 62. A velocity threshold value 64 is connected to a second input of the comparator 62. This velocity threshold value 64 is a predetermined value stored in memory (not shown) in the controller 26. The output 66 of the comparator is HIGH or TRUE when the determined velocity value from function 60 is greater than the velocity threshold value 64.

A displacement determining function 70 is coupled to the filtered acceleration signal and determines a displacement value from the acceleration signal by integration. The determined displacement value is connected to one input of a comparator function 72. A displacement threshold value 74 is connected to a second input of the comparator 72. This displacement threshold value 74 is a predetermined value stored in memory (not shown) in the controller 26. The output 76 of the comparator is HIGH or TRUE when the determined displacement value from function 70 is greater than the displacement threshold value 74.

The output 66 of comparator 62 and the output 76 of comparator 72 are connected to a NAND function 80. When both output signals 66 and 76 are TRUE or HIGH, the output of NAND function 80 is LOW. If either output 66 or 76 is LOW, the output of the NAND function 80 is HIGH. The output of the NAND function 80 is one input of an ANDing function 82. The output 54 of the deployment determiner function 50 is applied as a second input of the ANDing function 82. The output of the ANDing function 82 is connected to the airbag firing circuit 30. When the output of the ANDing function is HIGH, the airbag 14 is deployed. If the output of the ANDing function 82 remains LOW, the air bag 14 is not deployed.

Recall that a HIGH from the deployment determiner function 50 occurs when function 50 determines that the vehicle 12 is in a deployment crash condition. The outputs 66, 76 of the comparator functions 62, 72, respectively, are both normally LOW. If during a crash event, the determined displacement value and the determined velocity value have both exceeded their associated threshold values 74, 64, respectively, thereby indicating that an occupant is out-of-position, and the deployment determiner function 50 has not, at that time, determined a deployment crash condition was occurring, the air bag 14 is prevented from being deployed by effectively disabling the ANDing function 82 by the logic LOW from NAND function 80.

The velocity threshold value 64 and the displacement threshold value 74 are selected for a particular vehicle platform of interest through empirical testing and analysis of crash data for that vehicle platform. It should be appreciated that this disabling control is not dependent on the time of crash event. To prevent restraint activation during an otherwise deployment crash event, the velocity and displacement thresholds 64, 74, respectively, must both be exceeded before the deployment determiner function 50 determines that a deployment crash event is occurring. The deployment determiner 50 determining that a deployment crash event is occurring before the displacement determiner 70 and velocity determiner 60 both exceed their associated threshold indicated that the crash event has not moved the occupant out-of-position. The occupant not being moved out-of-position by the crash event means that there is sufficient time-to-fire ("TTF") for the air bag 14 to restraint the occupant.

Figure 2:
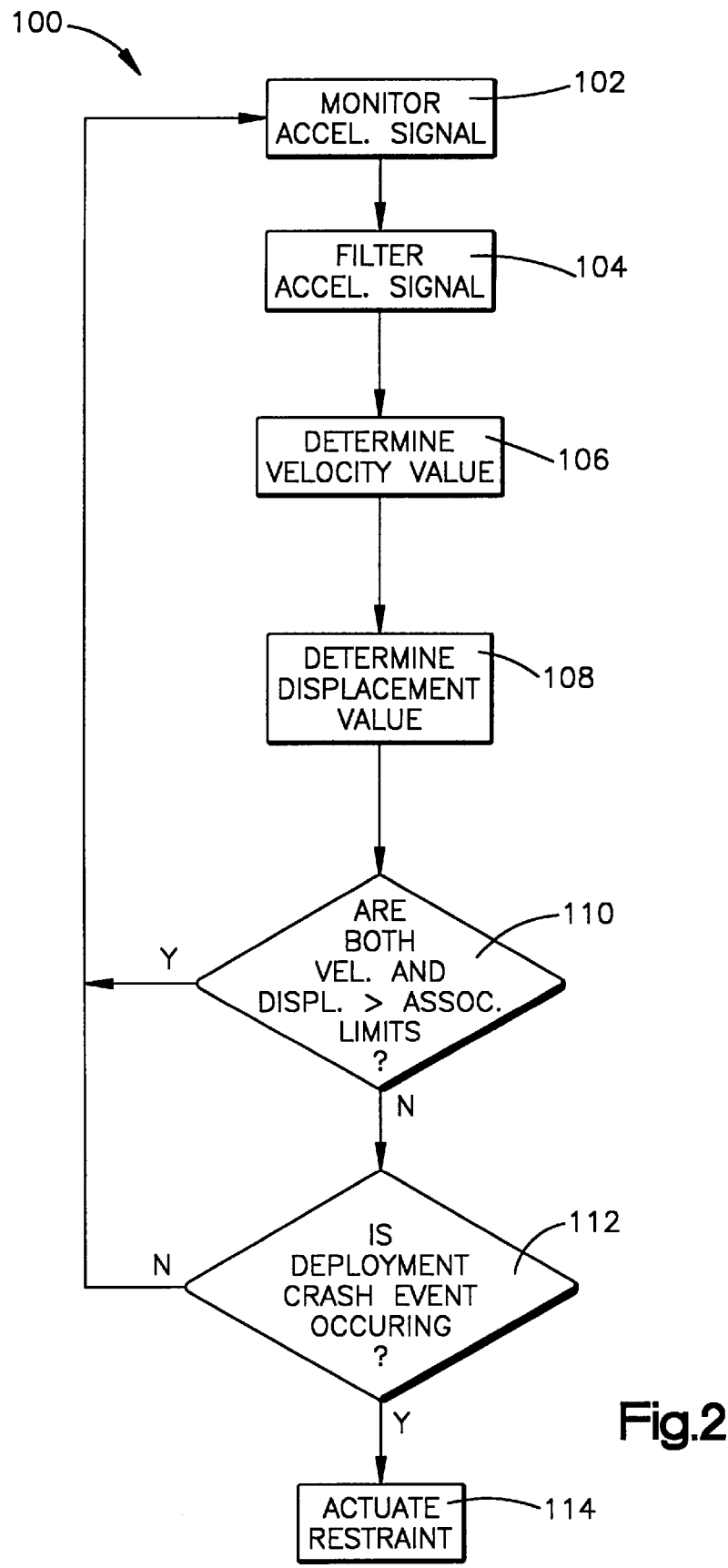
FIG. 2 is a flow chart depicting a control process in accordance with the present invention.

The method 100, in accordance with the present invention, is depicted in FIG. 2. The method includes the steps of monitoring 102 the acceleration signal from the accelerometer 10. The acceleration signal is then filtered in step 104. A velocity value and a displacement value are determined from the filtered acceleration signal in steps 106 and 108, respectively. The determined displacement value and the determined velocity value are compared against associated threshold values. A determination is made in step 110 as to whether both the velocity value and displacement value are greater than their associated limits. If affirmative, the process loops back to step 102. If negative, the process goes to step 112 where it is determined if a deployment crash event is occurring. If negative, the process loops back to step 102. If affirmative, the restraint is actuated in step 114. Therefore, if the determined displacement value and the determined velocity value exceed their associated threshold values before a deployment crash condition is determined to be occurring, the air bag is prevented from being deployed. If a deployment crash event is determined to be occurring before the determined displacement value and the determined velocity values both exceed their associated limits, the air bag is deployed.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for controlling an actuatable restraint in a vehicle, said apparatus comprising:

crash sensor for sensing a vehicle crash condition;

control means responsive to said crash sensor for providing an actuation signal for actuating said actuatable restraint;

means for determining a crash velocity value;

means for determining a crash displacement value; and means for preventing said actuation signal from actuation of said restraint when said crash velocity value and said displacement value exceed associated limits.

2. The apparatus of claim 1 wherein said crash sensor is an accelerometer that provides a signal having a characteristic indicative of crash acceleration.

3. The apparatus of claim 2 wherein said means for determining said crash velocity value includes an integrator for integrating said crash acceleration signal and said means for determining said crash displacement value includes an integrator for integrating said crash velocity and wherein said means for preventing includes comparators for comparing said crash velocity against its associated limit and for comparing said crash displacement against its associated limit.

4. The apparatus of claim 3 wherein said means for preventing includes means for logically ANDing the resultant comparisons of said crash velocity and crash displacement against their associated limits with said actuation signal so that said actuation signal does not actuate said restraint when both said crash velocity and said crash displacement exceed their associated limits.

5. An apparatus for controlling an actuatable restraint in a vehicle, said apparatus comprising:

an accelerometer providing a crash acceleration signal indicative of crash acceleration of the vehicle;

velocity determining means coupled to said accelerometer for determining a crash velocity value from said crash acceleration signal;

first comparing means for comparing said determined crash velocity value against a velocity threshold value and providing a first comparison signal indicative of the result of said comparison by said first comparing means;

displacement determining means coupled to said accelerometer for determining a crash displacement value from said crash acceleration signal;

second comparing means for comparing said determined crash displacement value against a displacement threshold value and providing a second comparison signal indicative of the result of said comparison by said second comparing means;

deployment determining means coupled to and responsive to said crash acceleration signal for determining if a deployment crash event is occurring and for providing a deployment control signal when it determines that a deployment crash event is occurring;

means for processing said deployment control signal with the first and second comparison signals so that said deployment control signal is prevented from actuating said actuatable restraint when said first comparison signal indicates that said determined velocity value is greater than said velocity threshold value and said second comparison signal means indicates that said determined displacement value is greater than said displacement threshold value.

6. A method for controlling an actuatable restraint comprising the steps of:

sensing a vehicle crash condition;

determining crash velocity;

determining crash displacement; and actuating said restraint in response to said sensed crash condition, said determined crash velocity, and said determined crash displacement so that said restraint is not actuated if said determined crash velocity and crash displacement exceed associated limits prior to said step of sensing a vehicle crash condition sensing a deployment crash condition.

7. A method for controlling an actuatable restraint in a vehicle, comprising the steps of:

sensing crash acceleration of the vehicle and providing a crash acceleration signal indicative of crash acceleration of the vehicle;

determining a crash velocity value from said crash acceleration signal;

comparing said determined crash velocity value against a velocity threshold value;

providing a first comparison signal indicative of the result of said comparison of said crash velocity value against said velocity threshold value;

determining a crash displacement value from said crash acceleration signal;

comparing said determined crash displacement value against a displacement threshold value;

providing a second comparison signal indicative of the result of said comparison of said crash displacement value against said displacement threshold value;

determining if said actuatable restraint should be actuated based on said crash acceleration signal and providing a deployment control signal when it is determined that a deployment crash event is occurring;

processing said deployment signal with the first and second comparison signals so that said deployment control signal is prevented from actuating said actuatable restraint when said determined velocity value is greater than said velocity threshold value and determined displacement value is greater than said displacement threshold value.

\* \* \* \* \*